Patented Aug. 23, 1932

1,873,946

UNITED STATES PATENT OFFICE

ERWIN KRAMER, OF COLOGNE-DEUTZ, BERNHARD BOLLWEG, OF LEVERKUSEN-ON-THE-RHINE, AND LUDWIG ZEH, OF WIESDORF-ON-THE-RHINE, GERMANY, ASSIGNORS TO GENERAL ANILINE WORKS, INC., OF NEW YORK, N. Y., A CORPORATION OF DELAWARE

MANUFACTURE OF SUBSTITUTED SULPHUR DYESTUFFS IN SUBSTANCE OR ON THE FIBER

No Drawing. Application filed June 21, 1928, Serial No. 287,342, and in Germany July 14, 1927.

The present invention relates to new sulphur dyestuffs and to a process of preparing the same.

In the process hereafter described we use as starting materials the sulphur dyestuffs which are obtainable by reacting upon binaphthylenedioxide with a sulphurating agent at a temperature between about 170 and 300° C. which process is more fully described in our U. S. Patent No. 1,758,324.

We have found that new valuable substituted sulphur dyestuffs are obtainable by treating the above mentioned starting materials with an alkylating, aralkylating or arylating agent, according to the process described in U. S. Patent No. 688,999.

We prefer to carry out the process by dyeing the fibers with the above mentioned starting materials, rinsing the goods and treating them with a solution of an alkylating, aralkylating or arylating agent (for instance, with a solution of dimethylbenzyl-phenyl-ammonium chloride) at an elevated temperature and preferably in the presence of an agent capable of exerting a reducing action and of a small amount of alkali. By working at a lower temperature or without the addition of a reducing agent the development is retarded and it may, according to the agents used in the subsequent treatment entirely fail to take place. The dyeings obtained display very satisfactory fastness to boiling and kier boiling.

Our new dyestuffs yield clear red shades of a quality which was not obtainable hitherto by means of sulphur dyestuffs.

The following examples illustrate the invention:—

*Example 1.*—The dyeing obtained on cotton with the sulphur dyestuff produced from binaphthylene dioxide by heating the same with sulphur monochloride to 80–120° C. and afterwards for several hours to 220–240° C. according to Example 2 of our U. S. Patent No. 1,758,324 is, after squeezing and rinsing, drawn for 10–20 minutes through a boiling bath, containing 4 ccs. of caustic soda lye (40° Bé.) 1.5 grams of hydrosulphite and 10 grams of dimethylbenzylphenyl-ammonium chloride per litre. In this manner is obtained a clear red dyeing, very fast to boiling and kier boiling.

By employing in this example trimethylphenyl-ammonium chloride as the developer a beautiful red is likewise obtained. Epichlorhydrin and monochlorhydrin yield duller shades. With the dyestuff obtainable by heating binaphthylenedioxide with sulphur to 240–280° C. for several hours and being produced in accordance with Example 1 of our U. S. Patent No. 1,758,324 and dimethylbenzylphenylammonium chloride a clear reddish orange results and with trimethyl-phenylammonium chloride a reddish yellow brown.

*Example 2.*—50 parts by weight of the dyestuff produced from binaphthylene dioxide in accordance with Example 2 of our U. S. Patent No. 1,758,324 are dissolved in water with twice the weight of crystallized sodium sulphide and 20 parts by weight of dimethylbenzylphenylammonium chloride or benzyl chloride are stirred in at the ordinary temperature. After a short while the benzylated dyestuff separates as a red powder, which no longer dissolves in water in the presence of sodium sulphide or hydrosulphide. With benzene, nitrobenzene and pyridine deep red solutions are obtained.

The term "a sulphur dyestuff derived from binaphthylene dioxide" is intended to include the dyestuffs which are obtainable by reacting upon binaphthylene dioxide with a sulphurating agent at a temperature between about 170 and 300° C.

We claim:—

1. As new products the compounds which are obtainable by treating a sulphur dyestuff obtainable by reacting upon binaphthylenedioxide with a sulphurating agent at a temperature between about 170 and 300° C. with a compound of the group consisting of the alkylating, aralkylating and arylating agents, the said compounds yielding on cotton clear red dyeings being fast to boiling and kier boiling.

2. As new products the compounds which are obtainable by treating a sulphur dyestuff obtainable by reacting upon binaphthylenedioxide with a sulphurating agent at a temperature between about 170 and 300° C. with an alkylating agent, the said compounds yielding on cotton clear red dyeings being fast to boiling and kier boiling.

3. As new products the compounds which are obtainable by treating a sulphur dyestuff obtainable by reacting upon binaphthylenedioxide with a sulphurating agent at a temperature between about 170 and 300° C. with trimethylphenyl ammonium chloride, the said compounds yielding on cotton clear red dyeings being fast to boiling and kier boiling.

In testimony whereof we have hereunto set our hands.

ERWIN KRAMER. [L. S.]
BERNHARD BOLLWEG. [L. S.]
LUDWIG ZEH. [L. S.]